United States Patent [19]
Carothers

[11] 3,894,355
[45] July 15, 1975

[54] METHOD AND MEANS FOR AUTOMATIC FIELD GROWING OF CROPS USING SOLID AND LIQUID WASTE

[76] Inventor: Charles H. Carothers, 51 Irving Pl., Red Bank, N.J. 07701

[22] Filed: Jan. 28, 1974

[21] Appl. No.: 436,853

[52] U.S. Cl. .................... 47/48.5; 47/1.2; 47/58; 47/DIG. 10; 71/13; 210/7
[51] Int. Cl.² .......................................... A01G 29/00
[58] Field of Search ........ 47/48.5, 58, DIG. 10, 1.2, 47/1 R, 17, 33; 210/7, 10, 11, 14, 17, 195, 152; 71/11, 13, 23, 32, 9

[56] References Cited
UNITED STATES PATENTS

| | | | |
|---|---|---|---|
| 419,242 | 1/1890 | Brown | 47/48.5 |
| 524,865 | 8/1894 | Rafter | 210/11 |
| 1,228,587 | 6/1917 | Nash | 71/13 X |
| 1,260,103 | 3/1918 | Wallace et al. | 71/13 |
| 1,408,064 | 2/1922 | Balmer | 71/13 X |
| 2,113,523 | 4/1938 | White | 47/33 |
| 2,632,979 | 3/1953 | Alexander | 47/58 |
| 2,855,725 | 10/1958 | Carothers | 47/17 |
| 3,436,341 | 4/1969 | Beuthe | 210/7 |
| 3,655,046 | 4/1972 | Trussell | 71/13 X |
| 3,728,254 | 4/1973 | Carothers | 210/7 |

OTHER PUBLICATIONS

"Soil Treatment Recommendations," Circular 724, C. M. Linsley, Dept. of Agronomy, June 1954, pp. 1–4.

*Primary Examiner*—E. H. Eickholt
*Attorney, Agent, or Firm*—J. Matthews Neale

[57] ABSTRACT

A method for field growing crops using solid and liquid waste and apparatus for practicing the method. The field to be used is provided in side-by-side spaced relation with row-like growing areas defined by paired laterally spaced perforated side walls extending the full length of the growing areas. The upper runs of the side walls of the respective growing areas mount in longitudinally spaced upstanding, spanning relation respective inverted, V-shaped, bracket members centrally depressed to provide longitudinally aligned U-shaped cradle seats supportingly receiving a continuous pipeline segment the opposite adjacent ends of which are cross-connected to form a continuous pipeline capped at one end and adapted at the opposite end for connection to a source of irrigating liquid which may be either hydrant water or the nutrient rich effluent of a sewage treatment plant. The pipeline at longitudinally spaced intervals along each growing area is fitted with downwardly directed mist nozzles arranged to spray the irrigating liquid downwardly between the paired side walls to provide a downward trickle flow of irrigating liquid successively through a longitudinally continuous topping layer of high nitrogenous humic acid forming material, a layer of top soil mixed with manure, a layer of mulch, a layer of bone meal, a layer of top soil, a further layer of mulch, a layer of inorganic alkaline potash, a further layer of top soil, a final layer of mulch into a layer of loose aggregate provided to support the roots of the growing food crop. The descending trickle flow by its leaching action enters the loose aggregate as a readily assimilable bacterial culture containing the complete plant nutrients including major and trace elements to seasonally feed the plants and produce a more perfect and prolific harvest.

11 Claims, 8 Drawing Figures

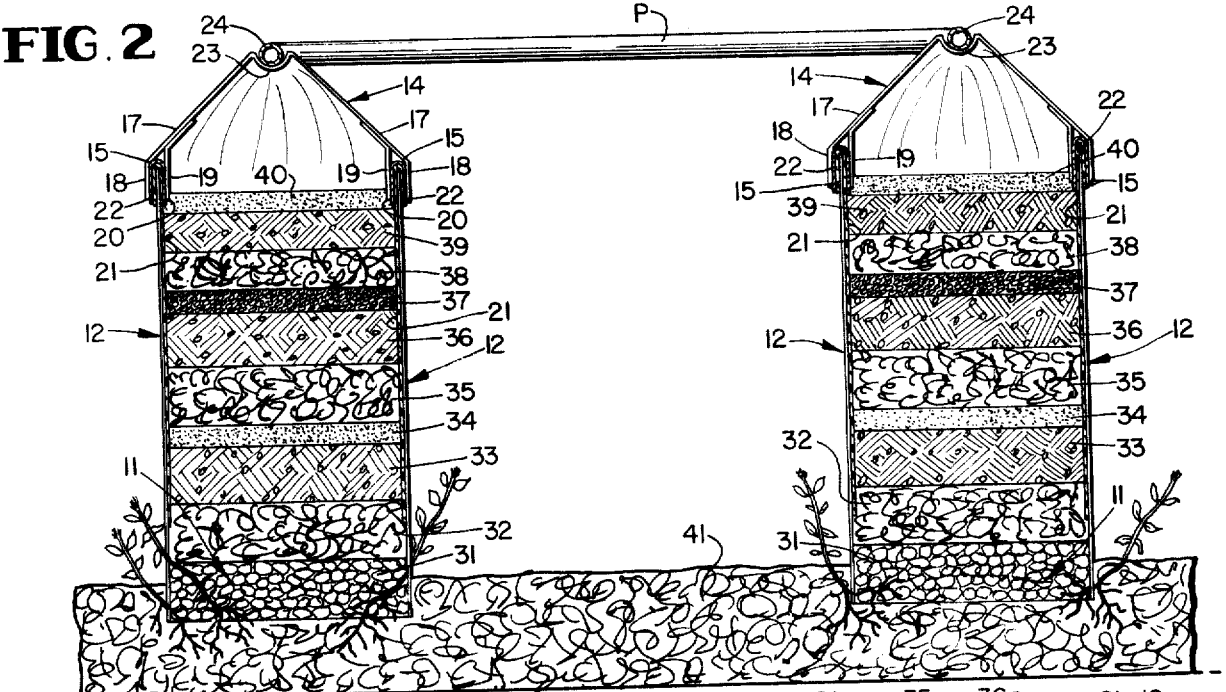
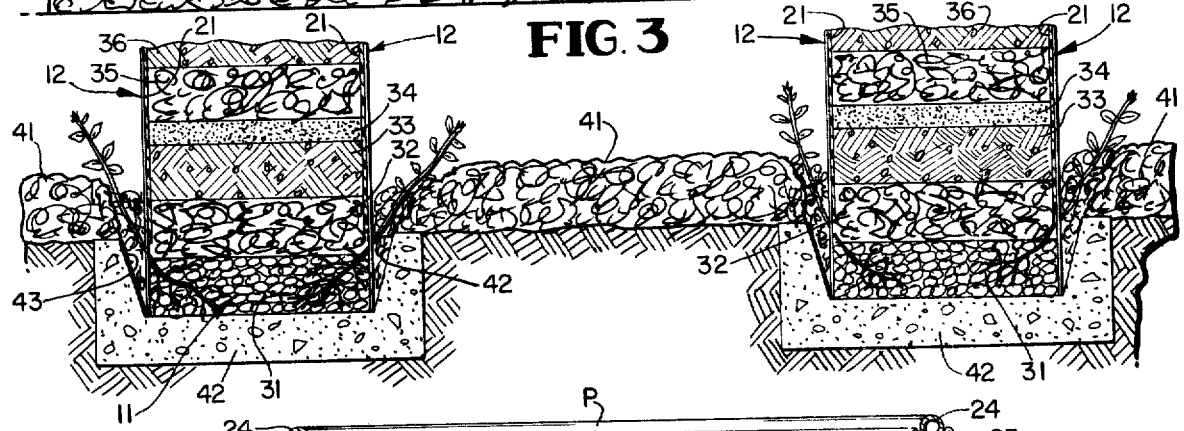
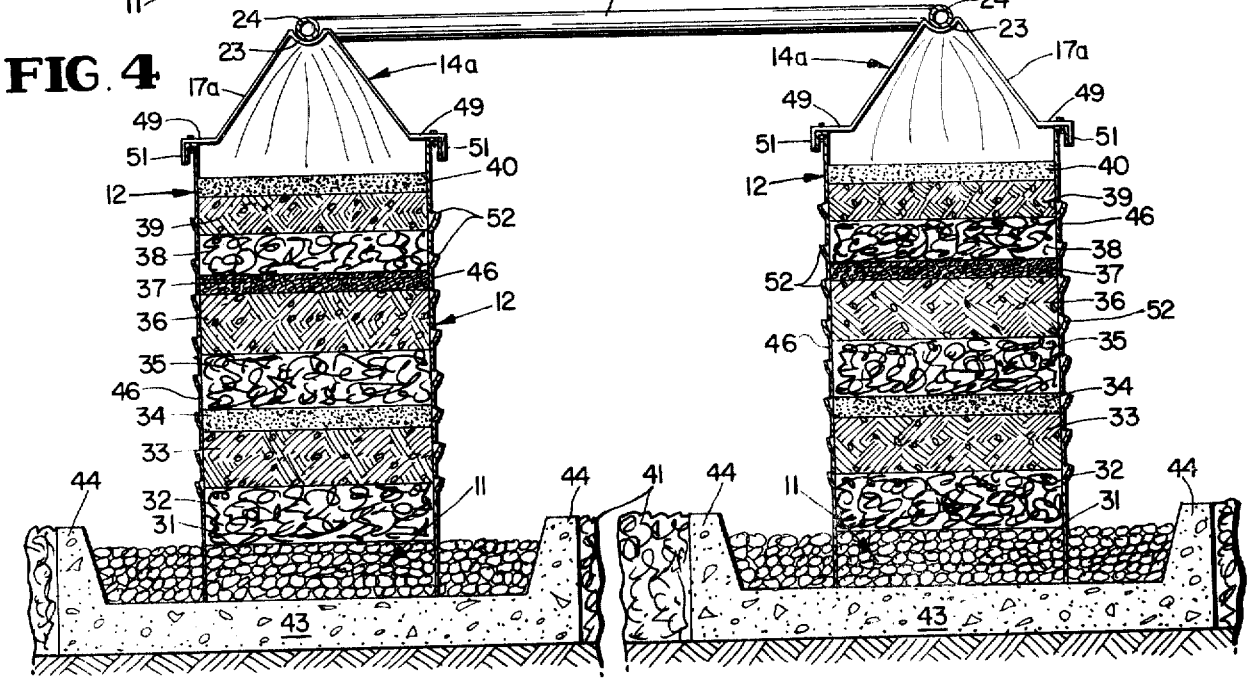

METHOD AND MEANS FOR AUTOMATIC FIELD GROWING OF CROPS USING SOLID AND LIQUID WASTE

BACKGROUND OF THE INVENTION

The present invention relates to the art of growing crops by the utilization of nitrogenous waste matter. One of the greatest problems facing industrialized nations today is (1) that of the pollution of our natural resources by existing methods of disposing of the enormous accumulations of nitrogenous waste matter created by the disposal of household garbage and the liquid and solid nitrogenous waste matter of modern day sewage treatment plants and (2) the inability to produce nutritious food supplies at a sufficiently low cost to adequately feed the people of the world. While it is generally recognized that organically grown food crops are more resistant to plant diseases, less susceptible to damaging by insect pests, and more productive of usable marketable produce, organic crop production is practiced on a very limited scale only and food crops so produced marketed generally only through small health food shops catering for the most part to health food fadists. The present invention is directed to a method and means of automatic field growing of crops using nitrogenous waste to provide an abundance of nutritious food for human consumption and at the same time utilizing the enormous accumulations of nitrogenous waste matter the disposal of which presents one of civilization's greatest pollution problems.

Modest proposals have been made (1) for organically growing tomatoes, exemplified by the so-called "Japanese Tomato Ring" described at page 10 of the South Carolina Gardener (date unknown) and a publication of the garden editor of the Miami Herald published in the Miami Herald of May 19, 1967; (2) the growing of other products as disclosed by applicant's earlier U.S. Pat. No. 2,855,725 issued Oct. 14, 1958; and (3) a proposal for the utilization of sewage and garbage treatment plant effluent (waste liquid) to grow food plants in a trough-like open garden and to package the treatment plant sludge (solid waste) of such a plant after drying for sale as fertilizer or as an "on site" sprayed fertilizer as disclosed by applicant's issued U.S. Pat. No. 3,728,254 of Apr. 17, 1973. It has also been proposed to utilize reticulated fencing to enclose composting materials for rooting vegetation to form box-like or circular plantings or hedge rows and wetting down the composting materials with "plant nutrients and conditioners" supplied by suitable irrigation piping as disclosed in U.S. Pat. No. 2,113,523 to S. H. White dated Apr. 5, 1938.

None of these proposals, however, contemplate field growing of plants nor do they disclose or suggest the preparation of larger field areas for growing food plants on a scale or in a manner to utilize the accumulations of solid waste matter including that from treatment plants as a topping for layered mulching material, top soil, alkaline matter, manure, bone meal, disposed in field rows over rooting deposits of loose aggregate and the subjecting of such layered components to a downward mist-like water spray to leach from the various layers the total plant food needs to produce on a commercial scale marketable produce.

SUMMARY OF THE INVENTION

It is a primary object of this invention to provide a method for field growing crops utilizing nitrogenous waste matter as a topping layer in side-by-side spaced longitudinally continuous field rows of sandwiched layers of loose aggregate rooting material, mulch, top soil, alkaline matter, mulch, top soil preferably mixed with manure, bone meal, mulch, top soil again preferably mixed with manure, supported along the sides and ends by air permeable retaining walls mounting a mist nozzle fitted water line arranged to constantly wet the topping layer to establish a "trickle irrigation" flow of a bacterial culture downwardly through the successive aerated layers of materials leaching from each layer its respective plant growth nutrient and maintaining in the loose aggregate root layer a complete plant food solution which is readily assimilated by the plant to be grown.

It is a further important object of the present invention to provide a method for utilizing the nitrogenous solid waste such as that obtained from a sewage treatment plant as the nitrogenous waste matter of the preceding object to eliminate the disposal and pollution problems posed by the accumulations of such solid wastes in our modern day industrial economy.

Another object of the present invention resides in the provision of novel apparatus for adapting an open field for use in practicing the method of the preceding objects.

More specifically, it is a further object of the present invention to divide an open field into spaced growing areas for practicing the foregoing method of field growing of food crops by providing air permeable retaining wall sections adapted for end-to-end connection in parallel spaced relation to define spaced row-like plant growing areas throughout a selected field; layering the row-like growing areas successively with a continuous layer of loose aggregate material for receiving the roots of the plants to be grown, and applying in succession to the loose aggregate layer, a layer of mulch, a layer of top soil, a layer of inorganic alkaline potash, a layer of mulch, a layer of top soil preferably mixed with manure, a layer of bone meal, a layer of mulch, a layer of top soil preferably mixed with manure, and a topping layer of nitrogenous solid waste; mounting on the upper runs of the parallel spaced air permeable retaining wall sections in longitudinally spaced, upstanding relation a series of bracket members defining a laterally centered, cradle-like depression; supporting a continuous water pipeline having downwardly directed mist nozzles spaced longitudinally from end-to-end of the row-like plant growing areas in the cradle-like depressions of the bracket members; and applying a thick layer of mulch to the exposed field areas between said row-like plant growing areas to inhibit weed growth in the exposed areas.

A further object of the present invention resides in installing beneath the layer of loose aggregate of the preceding object liquid retaining, open troughs comprising upstanding divergent side walls connected by a planar bottom wall disposed to supportingly receive the spaced air premeable retaining wall sections, said open troughs being either inset into the field surface or set directly on the field surface with the upstanding side walls spaced laterally outwardly of the retaining wall sections to maintain the thick layer of mulch applied to inhibit weed growth spaced outwardly of the retaining wall sections.

BRIEF DESCRIPTION OF THE DRAWINGS

Further objects will appear from the following description and appended claims when read in conjunction with the accompanying drawings wherein:

FIG. 2 is a transverse section through adjacent pairs of the spaced row-like growing areas and the intervening space therebetween to illustrate the preferred layering of the growing areas between plastic lined, fence wire, air permeable retaining walls provided by this invention and shown in FIG. 1:

FIG. 3 is a fragmental sectional view similar to FIG. 2 illustrating the growing area provided with a liquid retaining trough inset into the field surface;

FIG. 4 is a fragmental sectional view similar to FIG. 2 illustrating the growing area provided with a liquid retaining trough set directly on the field surface;

DESCRIPTION OF PREFERRED EMBODIMENT

Figure 1:
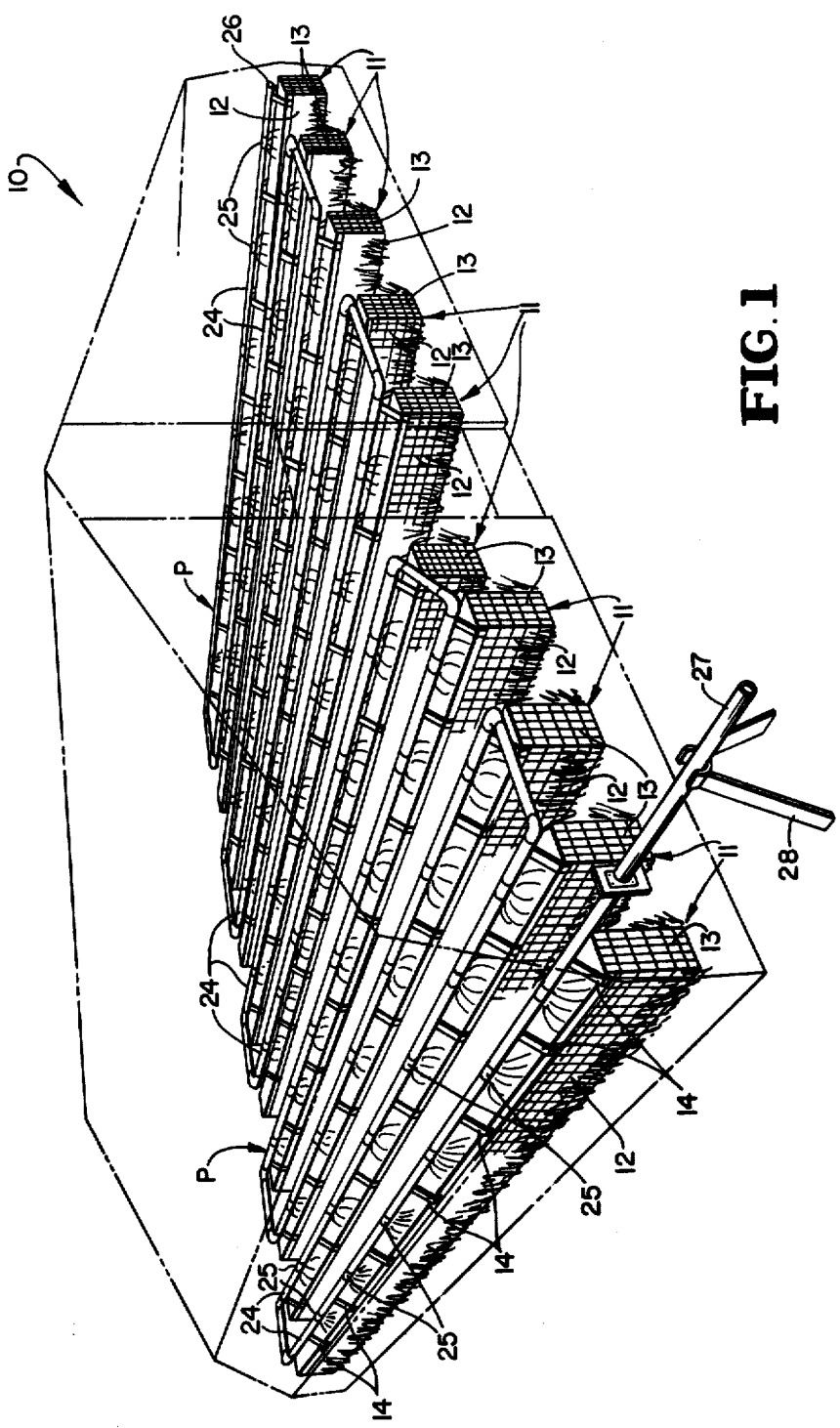
FIG. 1 is a perspective view of a field provided with one embodiment of the apparatus of this invention to adapt the field for automatically growing row-crop plants in accord with the method of this invention.
Figure 8:
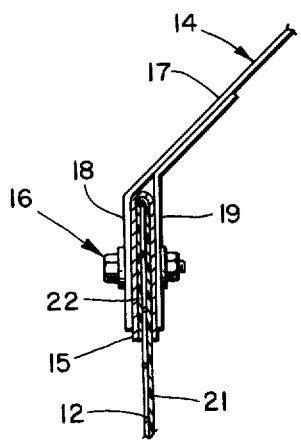
FIG. 8 is an enlarged detailed sectional view illustrating the manner of capping the open wire retaining walls of FIG. 1.

With continued reference to the drawings wherein like reference numerals are employed throughout the several views to designate the same parts, the field 10 of FIG. 1 is of a size to accommodate ten spaced row-like growing areas 11 extending the full width of the field. Each growing area 11 is defined by a pair of longitudinally continuous air permeable side walls 12 (See FIG. 2) spaced about 12 inches apart, the opposite ends of which are interconnected by air permeable end wall members 13, the end wall members at the near ends only being shown in FIG. 1. In the illustration of FIG. 1, the growing areas 11 are spaced apart a distance of about 2 feet and the paired side walls 12 are fitted with upstanding generally V-shaped inverted bracket members 14 of heavy sheet metal as most clearly seen in the leftmost growing area 11 of FIG. 1. In this embodiment of the invention the air permeable side walls 12 are made up of sections of 27 inch wire yard fencing of about 96 inches in length joined in end-to-end relation in number sufficient to extend the full length of the growing area 11. The wire fence lengths are preferably capped along their upper edges by generally U-shaped sheet metal reinforcing caps 15 (FIG. 2) inverted over the wire fencing with the opposed side walls riveted together or otherwise joined at spaced intervals to reinforce the top edge. The capped top edge at spaced intervals is drilled through the cap side walls to provide paired through openings (not shown) to pass the bolt shanks of attachment bolt and nut assemblies 16 (FIG. 8) mounting the respective brackets 14. As best seen in FIG. 2, the lower end of each bracket leg 17 is bent down at 18 and fitted with respective angle plates 19 fixedly secured in any suitable manner (for example spotwelding) to the under face of each diverging leg 17 near its lower end to form a straight sided passage dimensioned to freely admit the adjacently related drilled portions of reinforcing caps 15. The dependent bent down portion 18 and its opposed dependent angle plate wall 20 is through drilled to form paired through openings spaced to align with the paired through openings of the respective caps 15. These paired bracket openings are aligned with the paired openings of the opposed caps 15 in assembled relation to receive the aforementioned bolt and nut assemblies 16 which, when tightened, firmly secure each bracket member 14 in upstanding spanning relation between opposed side walls 12 (FIG. 2). Preferably the side walls 12 formed of open mesh fencing in the embodiments of FIGS. 2 and 3 are lined with perforated plastic sheeting 21 the upper edges 22 of which are folded around the capping strips 15 and clamped in place by the inter-engagement of strips 15 within the straight sided passages formed at the lower ends of bracket legs 17. These linings retain the layered materials to be presently described between side walls 12 while the perforations assure aeration of the layered materials.

As best seen in FIG. 2, each bracket member 14 is formed with a laterally centered U-shaped depression 23. These depressions, in the completed assembly, form longitudinally spaced, aligned cradles laterally centered along each growing area 11 and spaced about 12 inches above the plane defined by the top edges of caps 15. A pipeline P (FIG. 1), preferably formed by lengths of one inch water piping 24 fitted at regularly spaced intervals with downwardly directed mist nozzles 25 and interconnected at alternate ends of the respective growing areas 11, is cradled by the depressions 23 of brackets 14 to provide a continuous supply line for directing an irrigating spray of liquid downwardly between the paired side walls 12. The pipeline P at one end, the right end of FIG. 1, is capped at 26 while the opposite end is extended beyond the opposite end growing area 11 as shown at 27 (FIG. 1). The end extension 27 is suitably supported by a support member 28 and fitted at its free end for connection to a suitable liquid supply source (not shown) to be hereinafter described.

The respective growing areas 11 defined by the erected side walls 12 and brackets 14 are prepared for receiving the desired crop plants by layering the areas 11 as depicted in FIGS. 2 through 4 preferably in the following manner. First, a bottom root support layer of loose aggregate 31 extending continuously from end-to-end of each growing area 11 is deposited between the upstanding paired side walls 12 and about four inches thick. Next a three inch layer 32 of mulching material (leaves, grass cuttings, peat moss, pine bark, organic garbage, shredded newspaper and like materials) is deposited on aggregate layer 31. Next a three inch layer 33 of top soil is deposited on mulch layer 32. Upon the top soil layer 33, there is deposited a one inch layer 34 of inorganic alkaline potash supplied by layered potassium salts, glauconite, and/or green sand, followed by a further three inch layer 35 of mulching material. A further layer 36 of top soil is deposited on the layer 35 of mulching material and this layer is then covered with a one inch layer 37 of bone meal. The layer of bone meal 37 is then followed in succession by a two inch layer 38 of mulching material and a two inch layer 39 of top soil mixed with manure and a topping layer 40 of sewer treatment plant sludge, chicken manure, or blood meal, the layers 39 and 40 being composed of high nitrogenous humic acid forming matter.

The crop to be grown, in the form of root stock or seed, is then placed in the marginal edges of the aggregate layer just inside the side walls 12 and the ground area between the row-like growing areas is covered by a thick (about six inch) covering 41 of mulching to inhibit weed growth in the field area itself (See FIGS. 3 and 4), if not previously layed over the entire field area first and before setting of the side walls 12 as in FIGS. 1 and 2. In this connection, it will be noted that in FIG. 3, where only the lower portions of side walls 12 are shown, the growing areas 11 are delimited by open topped troughs respectively indicated by numeral 42 (FIG. 3) where the trough is inset into the field area. In all cases, the entire field area is thoroughly covered with a thick layer of mulch to discourage weed growth, and in the embodiment of FIGS. 3 and 4, troughs are formed of waterproof material to further isolate the created row-like growing areas from the natural plant growth roots that are present in the field.

Referring again to FIG. 3, it will be noted that trough 42, which is preferably a concrete trough, has upstanding side walls the inner faces 43 of which slope downwardly and inwardly to intersect the bottom wall along spaced longitudinally continuous lines of juncture coincident with the lower run of the wire fencing employed to form the side walls 12. It will be appreciated that this interfit of the lower run of side walls 12 with the line of intersection of the trough bottom wall with face 43 of the trough side walls serves to reinforce the side develop against lateral outward bulging forces that may develope in the loose aggregate base layer 31. This reinforcing in combination with the heavy sheet metal brackets 14 provides a structurally rigid wall structure for retaining the layered materials.

ALTERNATE EMBODIMENT

Figure 6:
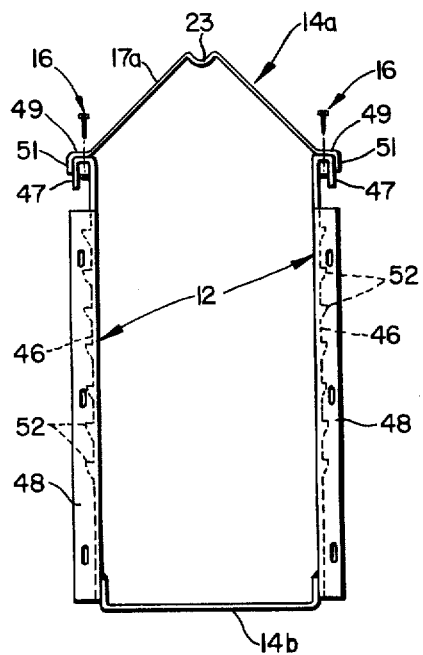
FIG. 6 is an end view of the sheet metal wall segment of FIG. 5.
Figure 7:
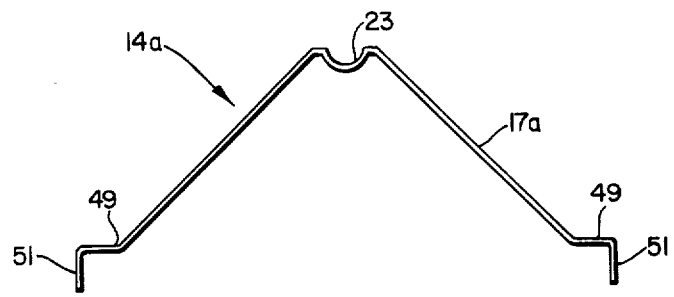
FIG. 7 is an end view of the modified pipeline support bracket employed in the embodiment of the invention illustrated in FIG. 4.

In contrast, the embodiment of FIG. 4 utilizes concrete troughs the upstanding side walls 44 of which are spaced laterally outwardly of the side walls 12. In this further embodiment, side walls 12 are formed of lengths of louvered sheet metal 46 detailed in FIGS. 5 and 6. As there shown, each length of sheet metal 46 is formed along its upper edge with an outturned reinforcing and mounting flange 47, which is through drilled at longitudinally spaced intervals to receive attachment bolt and nut assemblies 16 for mounting a modified form of upstanding bracket 14a (FIG. 7), and outturned end flanges 48 through drilled to secure the lengths of sheet metal 46 in end-to-end assembled relation. The brackets 14a embody legs 17a which diverge downwardly from the opposite ends of U-shaped, laterally centered depressions 23 at a steeper angle than that of brackets 14 and are provided at their lower ends with respective outturned, through drilled sections 49 and downturned terminal portions 51 arranged to overlap the upper marginal edges of the sheet metal walls 12. In assembled relation, brackets 14a and the end connected sheet metal side walls form an exceedingly rigid retaining structure for the layered materials.

Figure 5:
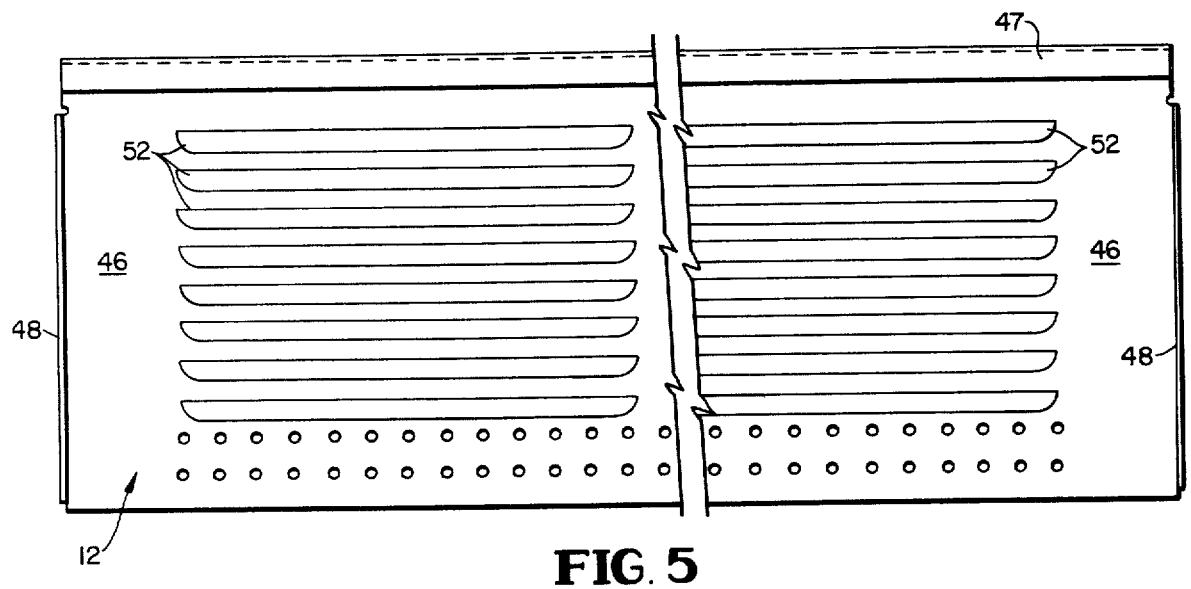
FIG. 5 is a side elevational view of an alternate form of side wall element employed in the embodiment of the invention illustrated in FIG. 4 and comprising a louvered sheet metal wall segment.

It will be further noted from an inspection of FIGS. 4 and 5 that the louvers 52 of the sheet metal side walls 12 extend longitudinally of the side walls 12 and are formed to provide upwardly opening louvers. This particular louvered structure is employed to assure downward percolation of the liquid supplied from pipeline P through the successive layers of material confined between side walls 12 and an effective aeration of the layered materials and downwardly percolating liquid.

In all embodiments of the invention, pipeline P and its mist nozzles are employed to maintain a trickle irrigation downwardly through the layered materials so as to form a nutrient rich solution in the base layer 31 of loose aggregate that is readily assimilated by the seed or root system of the crop to be grown. The creation of this nutrient rich solution is best effected by the layering arrangement heretofore described wherein the high nitrogenous humic acid forming materials comprise the uppermost layer 40 and pipeline P is arranged to directly impinge the liquid requirement of the plants to be grown on the topmost high nitrogenous layer at a rate compatible with the rate at which the crop being grown assimilates the solution forming in base layer 31. It is preferred, therefore, that the field growing of organic foods according to this invention be carried out under plastic or glass although open field growing is satisfactory and much less expensive. The dot-dash lines of FIG. 1 indicate a typical greenhouse enclosure widely employed in the floral industry for growing floral plants under controlled conditions that may be used here. It is also preferred that pipeline P be connected to a source of sewage treatment plant effluent, such as that produced under my prior U.S. Pat. No. 3,728,354 issued Apr. 17, 1973, although hydrant water may effectively be employed in its place, and that the activated sludge of my aforesaid Letters Patent be employed as the topmost layer 40.

Irrespective of the nature of the source liquid supplied and the use of a greenhouse, the structure of the present invention provides row-like growing areas which limit the fluid which reaches the roots of the desired plants substantially to that which enters the side walls between their upper runs and trickles downwardly through the layered materials. In all cases, the supplied liquid in its passage through the topmost layer 40 will, through contact with the sewer treatment plant sludge, chicken manure, or blood meal, form a nitrogenous solution having acid characteristics which, upon passage through adjacent top soil and manure layer 39, will be further acidified and leach out of the top soil mineral elements required by the plants being propogated. The succeeding lower layers 38, 35 and 32, as they become saturated with this descending acidic liquid break down forming absorbable carbon dioxide which, upon absorption into the percolating nitrogenous liquid, provides a carbon fortified solution required to effectively absorb and hold the liquid ammonia, soluble nitrate, phosphorous (obtained from the bone meal and rock phosphate), alkaline potash (obtained from green sand, glauconite and potash rock of layers 37 and 34), and further mineral elements (obtained from top soil layers 36 and 33) for efficient assimilation by the growing crop. In its tortuous passage downwardly through these various layers, the trickling solution undergoes aeration by reason of its contact with the air circulating inwardly through the apertured side walls of FIGS. 1 through 3 and the louvered walls of FIG. 4 and upwardly due to the heat created by the chemical disintegration taking place. Finally, upon reaching the root bearing loose aggregate of layer 31, the descending liquid has been developed into a readily assimilable bacterial culture supplying to the plant all the necessary plant nutrient, including required major and trace elements.

It will be appreciated that field growing of crops, particularly food crops, as contemplated by this invention, unlike conventional field cultivation by plowing and the use of commercial fertilizers, assures (1) the crop being grown of its complete nutrient requirements in a manner such that the crop is continuously maturing at its own assimilation pace without waste of plant nutrients to encourage growth of unwanted and detrimental weed growth; (2) more healthy and robust plants producing a more perfect and prolific harvest; (3) a saving in the disposal of solid wastes by productive utilization of organic and inorganic wastes rather than the relegation of such wastes as a fill for unwanted and odoriferous landfills: and (4) at least a partial solution of the undesirable pollution of the natural waterways and water resources and the poverty food needs of urban communities particularly where the organic farming practices of this invention are correlated with the construction of sewage treatment facilities to effect "on site" productive utilization of the effluent discharge and activated sludge produced by such treatment plants.

The invention may be embodied in other specific forms without departing from the spirit or essential characteristics thereof. The present embodiments are therefore to be considered in all respects as illustrative and not restrictive, the scope of the invention being indicated by the appended claims rather then by the foregoing description, and all changes which come within the meaning and range of equivalency of the claims are therefore intended to be embraced herein.

What is claimed and desired to be secured by Letters Patent is:

1. A method for automatically growing food crops utilizing nitrogenous solid waste matter comprising the steps of applying a thick layer of mulching material to the surface of a field area to control weed growth in said field area; erecting perforated retainer wall elements in spaced linear paired relation in said layered mulching material to define row-like plant growing areas in side-by-side spaced relation throughout the field area; filling the row-like plant growing areas defined by said wall elements in layered relation with successive gradulated layers of loose aggregate, mulching material, top soil, alkaline potash, mulching material, and a topping layer of nitrogenous solid waste matter serving as a seasonal plant food supply; setting the plants to be grown in the aggregate layer in linear spaced relation in the side edge areas adjacently related to the retainer wall elements; and providing a fluid supply line in vertically spaced, generally centered relation above said row-like plant growing areas to supply a regulated mist-like discharge of irrigating liquid downwardly to establish a percolating flow through said layered materials to maintain a constant supply of nutrient rich liquid within the aggregate layer for root feeding the set plants.

2. The method of claim 1 wherein said layered filling is supported along the row-like plant growing areas by upwardly opening, water-proof troughs interrupting said thick layer of mulching material and supporting the lower edges of said retainer wall elements which confine said layer of loose aggregate.

3. The method of claim 2 wherein said water-proof troughs are inset into trenches formed in the surface of said field area.

4. The method of claim 2 wherein said water-proof troughs rest on the surface of said field area and said thick layer of mulching material covers the field area between said troughs.

5. Apparatus adapting a field area for automatic growing of food crops comprising a thick layer of mulching material overlayed on a field area to control weed growth; respective perforated wall elements disposed in spaced, paired, upstanding, linear relation to define row-like plant growing areas in side-by-side spaced relation throughout the mulched filed area; a first layer of loose aggregate disposed between said spaced, paired perforated wall elements to form a support base for the roots of plants to be grown; a layer of mulching material disposed upon said aggregate layer between said perforated wall elements to form a base for supporting successive graduated layers of top soil, alkaline potash, mulching material, top soil, bone meal, mulching material, and a topping layer of nitrogenous solid waste matter; and means, including a pipeline coextensive with the respective row-like plant growing areas and supported in generally centered relation between said paired perforated wall elements in vertically spaced relation above said layered plant food supply, said pipeline being fitted at longitudinally spaced intervals with downwardly directed, mist nozzles controlled to regulate the liquid flow therefrom to assure a percolating trickle flow of liquid downwardly through said layered material to maintain during the growing cycle of the food crop a readily assimilable supply of nutrient rich liquid within the aggregate layer for root feeding of the plants to be grown.

6. The plant growing structure of claim 5 wherein said perforated wall elements comprise respective lengths of woven wire fencing interiorly lined with perforated plastic sheeting to retain the plant food supply in longitudinally coextensive layered relation along said row-like plant growing areas.

7. The plant growing structure of claim 5 wherein said thick layer of mulching material is interrupted along said row-like plant growing areas by longitudinally coextensive, liquid retaining, troughs having upstanding side walls; said lined perforated wall elements are directly supported on the floor of said troughs; and said layer of loose aggregate is disposed on said trough floor between the lowermost runs of said lined perforated wall elements with the layered plant food supply superimposed on said layer of loose aggregate.

8. The plant growing structure of claim 7 wherein said upwardly opening, longitudinally coextensive, liquid retaining, troughs are disposed on the surface of said field area; the floor of said troughs extend laterally beyond the lined perforated wall elements; and the layer of loose aggregate extends laterally beyond the lined perforated wall elements defining marginal runs of loose aggregate outwardly related to said perforated wall elements for supporting the roots of the plants to be grown.

9. The plant growing structure of claim 5 wherein said field area is interrupted along said row-like plant growing areas by longitudinally coextensive, liquid retaining, troughs having upstanding side walls and inset into the row-like plant growing areas to the depth of said upstanding side walls; said upstanding side walls have oppositely facing interior faces inclined upwardly and outwardly; and said lined perforated wall elements are directly supported on the floor of said troughs along the line of intersection of said floor and said side wall interior faces.

10. The plant growing structure of claim 5 wherein said perforated wall elements comprise lengths of steel plate having longitudinally directed, louvered slots disposed in vertically arranged rows opening upwardly and outwardly, said lengths of steel plate being connected in end-to-end relation to provide longitudinally coextensive perforated wall elements.

11. The plant growing structure of claim 5 wherein said pipeline of said last mentioned means is supported by inverted generally V-shaped bracket members end connected to the paired perforated wall elements and having laterally centered, semicylindrical seats at their respective apices to cradle support said pipeline.

* * * * *

UNITED STATES PATENT AND TRADEMARK OFFICE
CERTIFICATE OF CORRECTION

PATENT NO. : 3,894,355
DATED : July 15, 1975
INVENTOR(S) : Charles H. Carothers

It is certified that error appears in the above–identified patent and that said Letters Patent are hereby corrected as shown below:

Column 5, line 33 and 34, change "develop" to -- walls --

Column 6, line 29, change patent number "3,728,354" to -- 3,728,254 --

Column 7, line 48, change "gradulated" to -- graduated --

Column 8, line 14, change "filed" to -- field --

Signed and Sealed this ninth Day of March 1976

[SEAL]

Attest:

RUTH C. MASON
Attesting Officer

C. MARSHALL DANN
Commissioner of Patents and Trademarks